US007134771B2

(12) United States Patent
Stout et al.

(10) Patent No.: US 7,134,771 B2
(45) Date of Patent: Nov. 14, 2006

(54) AUTOMOBILE LAMP ASSEMBLY HAVING ROTATING ANTI-GLARE SHIELD AND METHOD

(75) Inventors: Bo J. Stout, Indianapolis, IN (US); Michael F. Lisowski, Anderson, IN (US)

(73) Assignee: Guide Corporation, Pendleton, IN (US)

( * ) Notice: Subject to any disclaimer, the term of this patent is extended or adjusted under 35 U.S.C. 154(b) by 125 days.

(21) Appl. No.: 10/771,772

(22) Filed: Feb. 4, 2004

(65) Prior Publication Data

US 2005/0180144 A1 Aug. 18, 2005

(51) Int. Cl.
*B60Q 1/16* (2006.01)
*F21V 11/08* (2006.01)

(52) U.S. Cl. ...................... 362/465; 362/512; 362/280; 362/284; 362/539; 359/601

(58) Field of Classification Search ............ 362/37–60, 362/66, 69, 459–499, 500–549, 284, 280; 359/229, 234, 613, 601
See application file for complete search history.

(56) References Cited

U.S. PATENT DOCUMENTS

| | | | | |
|---|---|---|---|---|
| 1,389,243 | A * | 8/1921 | De Vigan | 362/257 |
| 1,554,427 | A | 9/1925 | Englen | |
| 1,678,170 | A * | 7/1928 | Tjaden | 362/351 |
| 2,665,371 | A * | 1/1954 | Rynearson | 362/303 |
| 3,176,124 | A | 3/1965 | Cible | |
| 4,075,469 | A * | 2/1978 | Alphen | 362/276 |
| 4,271,459 | A | 6/1981 | James | |
| 4,875,141 | A * | 10/1989 | Miyauchi et al. | 362/465 |
| 4,922,390 | A * | 5/1990 | Nakazawa et al. | 362/512 |
| 4,967,319 | A * | 10/1990 | Seko | 362/466 |
| 5,023,758 | A | 6/1991 | Allen et al. | |
| 5,068,768 | A * | 11/1991 | Kobayashi | 362/539 |
| 5,158,352 | A * | 10/1992 | Ikegami et al. | 362/512 |
| 5,264,993 | A | 11/1993 | Neumann et al. | |
| 5,285,358 | A * | 2/1994 | Watanabe et al. | 362/538 |
| 5,426,571 | A * | 6/1995 | Jones | 362/466 |
| 5,436,807 | A * | 7/1995 | Kobayashi | 362/41 |
| 5,860,735 | A | 1/1999 | Keech | |
| 6,007,221 | A | 12/1999 | Taniuchi et al. | |
| 6,059,435 | A * | 5/2000 | Hamm et al. | 362/514 |
| 6,186,651 | B1 | 2/2001 | Sayers et al. | |
| 6,227,691 | B1 | 5/2001 | Hogrefe et al. | |
| 6,663,270 | B1 * | 12/2003 | Taniuchi et al. | 362/514 |
| 2002/0085387 | A1 * | 7/2002 | Taniuchi | 362/539 |
| 2005/0024889 | A1 * | 2/2005 | Sugimoto | 362/539 |

* cited by examiner

*Primary Examiner*—Ali Alavi
*Assistant Examiner*—Ismael Negron
(74) *Attorney, Agent, or Firm*—Ice Miller LLP

(57) ABSTRACT

An automobile lamp assembly including a movable glare shield which is moved into the portion of the beam of light produced by a lamp assembly that is associated with the foreground area, thereby reducing the illumination level in the foreground area. The shield may be rotatably moved out of the blocking position to allow for a full illumination pattern when glare is not present.

10 Claims, 6 Drawing Sheets

AUTOMOBILE LAMP ASSEMBLY HAVING ROTATING ANTI-GLARE SHIELD AND METHOD

BACKGROUND OF THE INVENTION

The intensity, beam pattern and beam aim point of vehicle front lamp assemblies are regulated because of the impact they have on various safety issues. Sufficient light is needed under a variety of driving conditions so as to allow the operator of a vehicle to see the road being traveled upon as well as hazards that may present themselves. The concern with adequate lighting is balanced by safety concerns for others.

An operator of a vehicle may be blinded by the front lamps of an oncoming vehicle. Similarly, a pedestrian may be blinded by the front lamps of an oncoming vehicle. Typically, the blinding is a result of direct glare. That is, glare resulting from light emitted from the lamp assemblies directly into the eyes of the operator or pedestrian (also referred to as disability glare and discomfort glare). Concern for this type of glare has resulted in regulations regarding the shape of the upper portion of the emitted beam as well as the illumination level in that upper portion.

The problem of direct glare has been addressed in a number of ways. The most significant manner of addressing this issue is the use of two different beam patterns, high beam and low beam. Depending upon the situation, such as other traffic in the vicinity, the vehicle operator selects the desired beam in order to decrease the light emitted by the front lamp assemblies ("low beam") or to increase the light emitted by the front lamp assemblies ("high beam"). Multiple beams may be realized by using multiple light sources and/or moving a cutoff shield, a reflector, the light source and or the lens of the lamp assembly.

While the problem of glare for other operators and pedestrians has been given a significant amount of attention, the problem of glare to the operator of the vehicle from the vehicles own front lamps has remained largely unaddressed. Glare to the operator of a vehicle, or reflective glare, typically occurs as a result of wet, snow-covered or icy road conditions. In this environment, light from the lowest portion of the emitted light beam, used to light the road immediately in front of the vehicle or the foreground area, can be reflected back at the vehicle, blinding the operator.

The problem of reflective glare can be addressed to some extent by the use of shaped light beams, either by using a square reflector or manufacturing a lamp assembly with a permanent foreground shield that eliminates foreground lighting. However, these approaches unnecessarily eliminate foreground lighting under conditions wherein reflective glare is not a concern (i.e. dry road conditions). Moreover, if a reflective foreground shield is used, the problem of direct glare may be exacerbated. By reflecting a beam back through the main reflector, the emitted beam may not be uniform since the light reflected from the shield will typically not be emitted in a direction parallel to light that has not been reflected by the shield.

The potential impact of any solution to the reflective glare issue should take into consideration potential design limitations. By way of example, designers of sports cars frequently attempt to design vehicles with a low-slung, sleek appearance. Such designs may require a headlamp to be mounted at or very near the upper portion of the front of the vehicle, with little if any freeboard above the headlamp. This presents a challenge when reducing reflective glare for headlamps wherein the upper portion of the light beam reflected off the reflector is the primary contributor to reflective glare. In such headlamps, any additional hardware cannot be mounted near the upper part of the headlamp.

Therefore, a need exists for an automotive lighting system that provides for the reduction and/or elimination of foreground lighting when reflective glare conditions exist (i.e. when roads are icy, snow-covered or wet), but that also allows more intense illumination of the foreground area when reflective glare conditions do not exist (i.e. when roads are dry). It would be beneficial if the lighting system did not require additional equipment to be placed above the headlamp assembly. It would be further beneficial if the system operated with a variety of light source, shield and reflector configurations.

BRIEF SUMMARY OF THE INVENTION

In accordance with the present invention, a lamp assembly is provided which overcomes the disadvantages of the prior art by providing for reduced illumination of the foreground area when reflective glare is present. According to one embodiment, a rotating shield is located between the reflector and the lens of a lamp assembly. Initially, the shield is placed in a position where it does not block light directed to a forground area from passing out of the lamp assembly. The shield may be opaque, translucent or transparent. When needed or desired, the shield is rotated into the beam of light coming from the reflector, such that illumination in the foreground is reduced.

In one embodiment, the shield includes an opaque obstruction generally in the form of a partial epicycloid. When rotated into a blocking position, the shield projects into the beam of light formed by the reflector, reducing the amount of light that is projected into the foreground area of the illumination field of the lamp assembly. In an alternative embodiment, the shield comprises a glass shield with areas of varying degrees of light transparency. In this embodiment, when reflective glare is sensed, the glass shield can be rotated to a position that reduces the emitted light in the foreground area. In another embodiment, a free-formed spreading lens with areas of varying curvatures redirect portions of light in the light beam pattern.

DETAILED DESCRIPTION OF THE INVENTION

Figure 1:
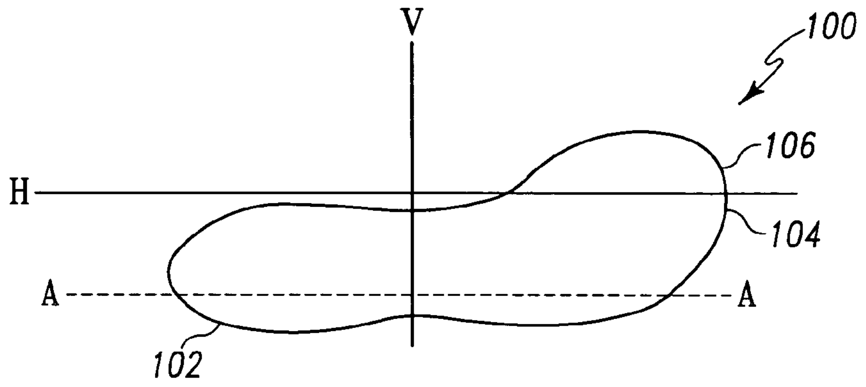
FIG. 1 is an illustration of a typical light beam emitted from a lamp assembly onto a measuring screen.

FIG. 1 is a view illustrating a typical light beam emitted from a lamp assembly onto a measuring screen. The measuring screen includes vertical axis V and horizontal axis H. A typical light beam is shown by pattern 100. Pattern 100 includes foreground portion 102, middle portion 104 and upper portion 106. Foreground portion 102 is generally bounded on the upper side by dashed line A—A. In operation, foreground portion 102 is directed to the foreground area in front of the vehicle, lighting the road immediately in front of the vehicle. Accordingly, the foreground portion of the emitted beam is the primary contributor to reflective glare.

Upper portion 106 is bound on the lower side by horizontal axis H. In a typical passing or low beam pattern in countries that drive in the right hand lane, upper portion 106 is generally limited to the right hand side of the beam pattern as viewed from a vehicle. This is done to avoid direct glare from the lamp assembly to the occupant of an oncoming vehicle and is shown in FIG. 1. A non-passing or high beam pattern is not so limited. Thus, as applied to the pattern of FIG. 1, the upper portion of a high beam pattern would extend to the left of vertical axis V.

Middle portion 104 is typically not a significant contributor to either reflective or direct glare. For purposes of discussion, middle portion 104 is defined to be the portion of the emitted beam of a lamp assembly that is above the foreground portion and below the horizontal axis H. Obviously, the aim point and mounting height of the lamp assembly when used in an operational situation will affect the extent to which each portion discussed above contributes to direct or reflective glare. Accordingly, the shape and size of the above defined portions may vary from embodiment to embodiment.

Figure 2:
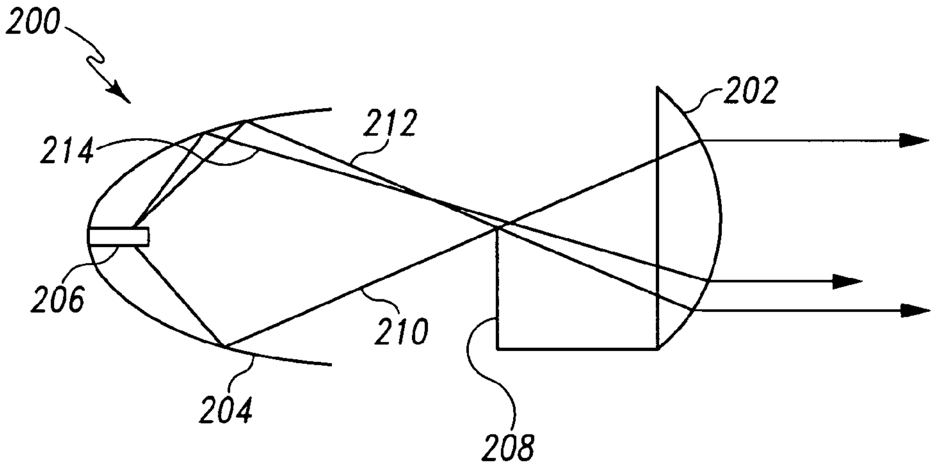
FIG. 2 is a diagrammatic side view of a lamp assembly.

FIG. 2 is a diagrammatic side view of a lamp assembly 200. Lamp assembly 200 includes lens 202, reflector 204, light source 206 and cutoff shield 208. Light is emitted by light source 206 and reflected by reflector 204 in a forward direction through lens 202. Cutoff shield 208 defines the upper vertical boundary of the beam of light emitted by lamp assembly 200. This is shown by light ray 210, which passes over cutoff shield 208 and represents the uppermost light beam emitted by lamp assembly 200. Light ray 212 shows the lowest ray of light emitted by lamp assembly 200 into the foreground area 102 (shown in FIG. 1). Light ray 214 shows the lowest ray of light emitted by lamp assembly 200 above the foreground area 102 and into the middle portion 104 of the beam pattern shown in FIG. 1.

As is well known in the art, variations in the vertical extent of the emitted light beam, such as upper portion 106 of pattern 100 in FIG. 1, can be effected by variations in the height of cutoff shield 208 along its length. In certain applications additional light can be emitted by the lamp assembly above light ray 210 by changing the inclination of cutoff shield 208 to a more horizontal state. Thus, a single lamp assembly can provide both low beam and high beam patterns by moving the cutoff shield into and out of a blocking position.

Figure 3:
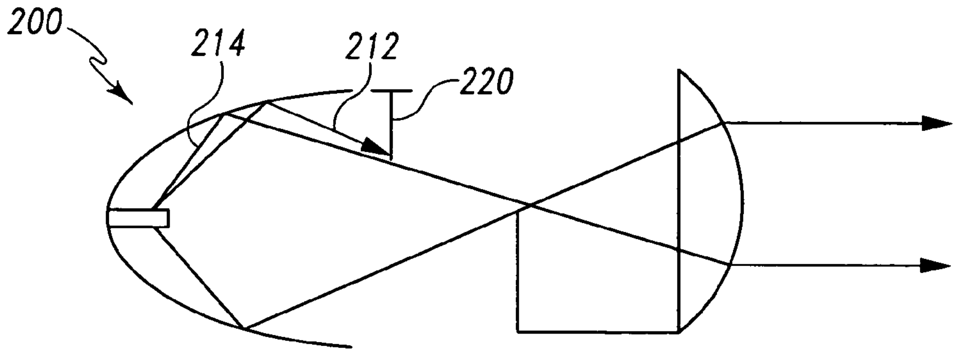
FIG. 3 is a diagrammatic side view of the lamp assembly of FIG. 2 with a foreground shield reducing the emitted light beam.
Figure 4:
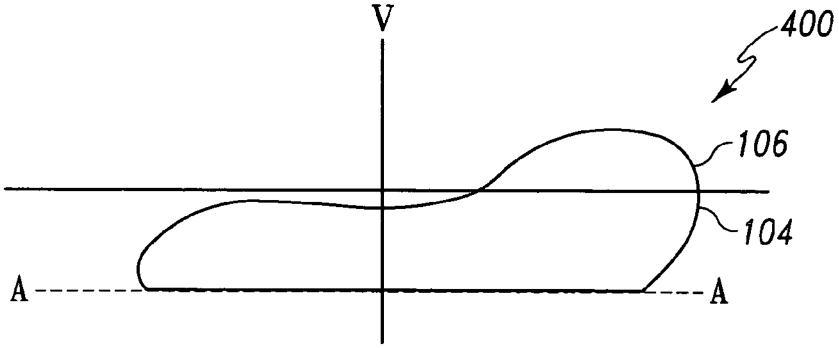
FIG. 4 is an illustration of a light beam emitted from a lamp assembly onto a measuring screen with reduced foreground area illumination.

FIG. 3 shows lamp assembly 200 of FIG. 2 with a foreground shield inserted into the forward beam. Specifically, foreground shield 220 has been positioned such that light ray 212 is blocked while light ray 214 is allowed to be emitted from lamp assembly 200. The resulting beam pattern is shown as pattern 400 of FIG. 4. FIG. 4 shows the measuring screen of FIG. 1, along with dashed reference line A—A generally indicating the upper boundary of the foreground portion of pattern 100. As is shown in FIG. 4, if foreground shield 220 is designed properly it can eliminate all the illumination from lamp assembly 200 in the foreground area (the area below dashed line A—A). Accordingly, reflective glare from the foreground area is eliminated.

Figure 5:
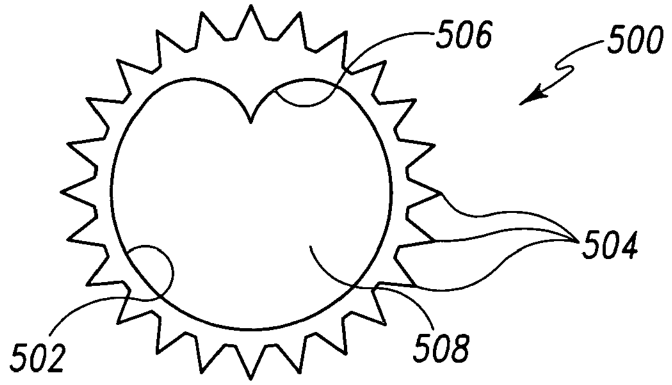
FIG. 5 is a plan view of one embodiment of a foreground shield.
Figure 6:
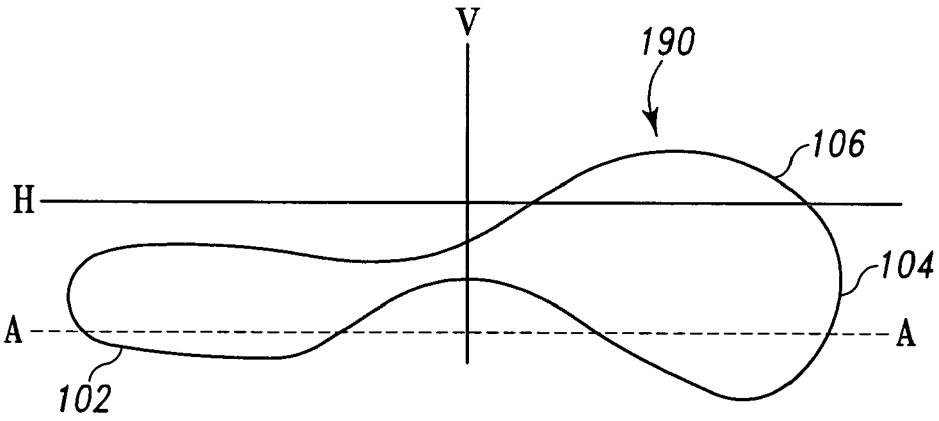
FIG. 6 is an illustration of the light beam emitted from a lamp assembly with the foreground shield of FIG. 5 is in its blocking position.

In accordance with one embodiment of the present invention, the foreground shield is rotatable into the forward beam of light so that the shield can be rotated into a position that blocks light during icy, snowy and wet road conditions and rotated into a position that does not block any light during dry road conditions. FIG. 5 shows a plan view of a rotatable foreground shield 500. With reference to FIG. 5, foreground shield 500 comprises ring 502, teeth 504 that extend from ring 502, and protuberance 506 that extends inwardly from ring 502 into a vacant portion 508 of the foreground shield 500. In this embodiment, protuberance 506 is generally in the shape of a partial epicycloids. This shape affects the emitted light pattern more significantly in the lower center of the pattern than at the lower outer edges of the pattern. FIG. 6 shows the resulting beam pattern 190 of a lamp assembly that incorporates foreground shield 500. As shown in FIG. 6, the lower center of the foreground portion 102 is eliminated and, thus, reflective glare is substantially reduced.

Figure 7:
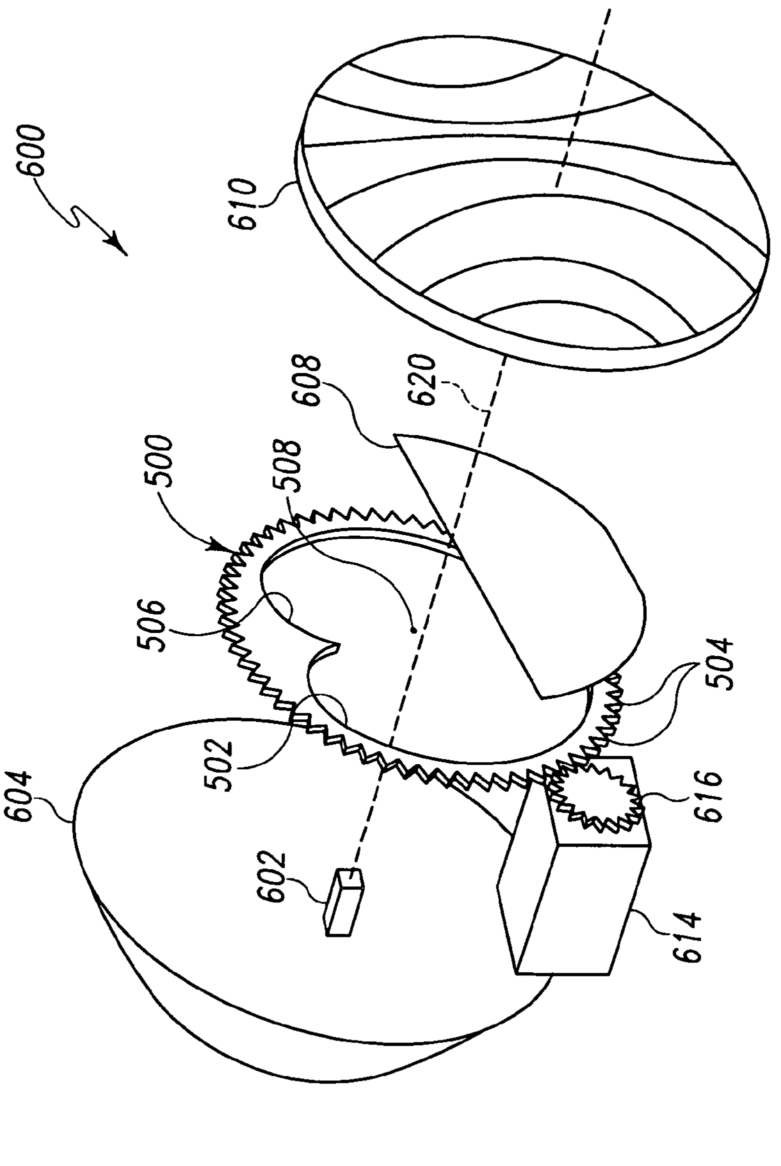
FIG. 7 is a perspective view of a lamp assembly with the foreground shield of FIG. 5.

FIG. 7 shows a partial perspective view of a lamp assembly 600 with rotatable foreground shield 500. As shown in FIG. 7, lamp assembly 600 comprises light source 602. Light from light source 602 is reflected in a forward direction off of reflector 604 through vacant inner portion 508 of foreground shield 500, over cutoff shield 608 and out through lens 610. The reflected light travels in a direction generally parallel to optical axis 620 of reflector 604.

Cutoff shield 608 blocks a portion of light from impinging on lens 610. When foreground shield 500 is placed in the position shown in FIG. 7 (the "blocking position"), a portion of the light reflected off of reflector 604, that would otherwise proceed past cutoff shield 608, is blocked by protuberance 506 of foreground shield 500. The position of foreground shield 500 is controlled by motor 614 and attached gear 616 which engages teeth 504 of the foreground shield. Foreground shield 500 is thus rotated in a plane generally perpendicular to optical axis 620 in between its blocking position and a position where none of the light that proceeds past cutoff shield 608 is blocked by protuberance 506 (the "pass-through position"). In this embodiment, protuberance 506 is opaque with a black matte finish. Accordingly, light impinging upon protuberance 506 does not contribute appreciably to the light emitted from lamp assembly 600.

Figure 8:
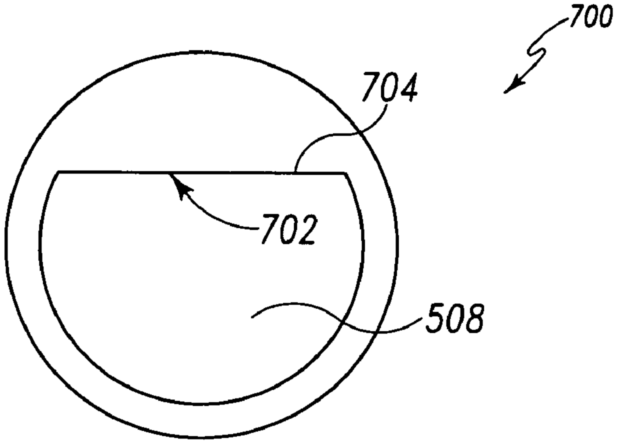
FIG. 8 shows a second embodiment of the foreground shield that can be utilized to reduce reflective glare.
Figure 9:
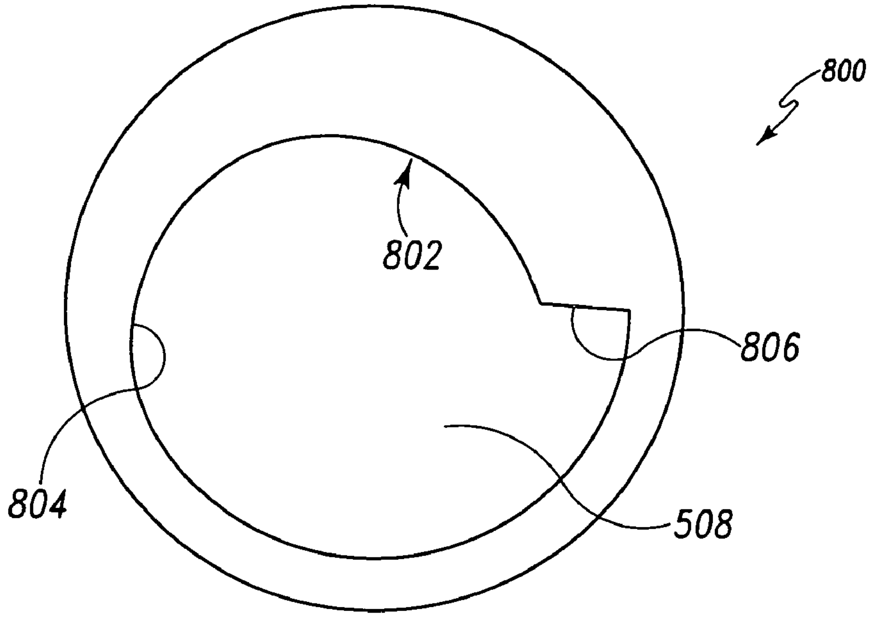
FIG. 9 shows a third embodiment of the foreground shield that can be utilized to reduce reflective glare.

As will be appreciated by those of skill in the art, a number of alternative embodiments of rotatable foreground shield may be realized within the scope of the present invention. The following embodiments are provided by way of example, but not of limitation. FIG. 8 is another embodiment of the rotatable foreground shield 700 with a protuberance 702 that forms a solid horizontal edge 704 across the top portion of the foreground shield. Alternatively, FIG. 9 shows another embodiment of a rotatable foreground shield 800 with a protuberance 802 that is in the shape of a curved ramp. As shown in FIG. 9, the first end 804 of protuberance 802 extends only slightly into the vacant portion 508 of the foreground shields while the second end 806 of the protuberance extends more significantly into the vacant portion of the foreground shield. In this embodiment, the extension into the vacant portion is gradual. However, a series of distinct protuberances of increasing size may also be used. In this embodiment, foreground shield 800 will allow for iterative levels of occlusion as the foreground shield is rotated between its first end 804 that extends only slightly into the light beam and its second end 806 that extends more significantly into the light beam. Thus, as the foreground shield 800 is rotated into the path of the forward beam, an increasing amount impinges the foreground shield.

Figure 10:
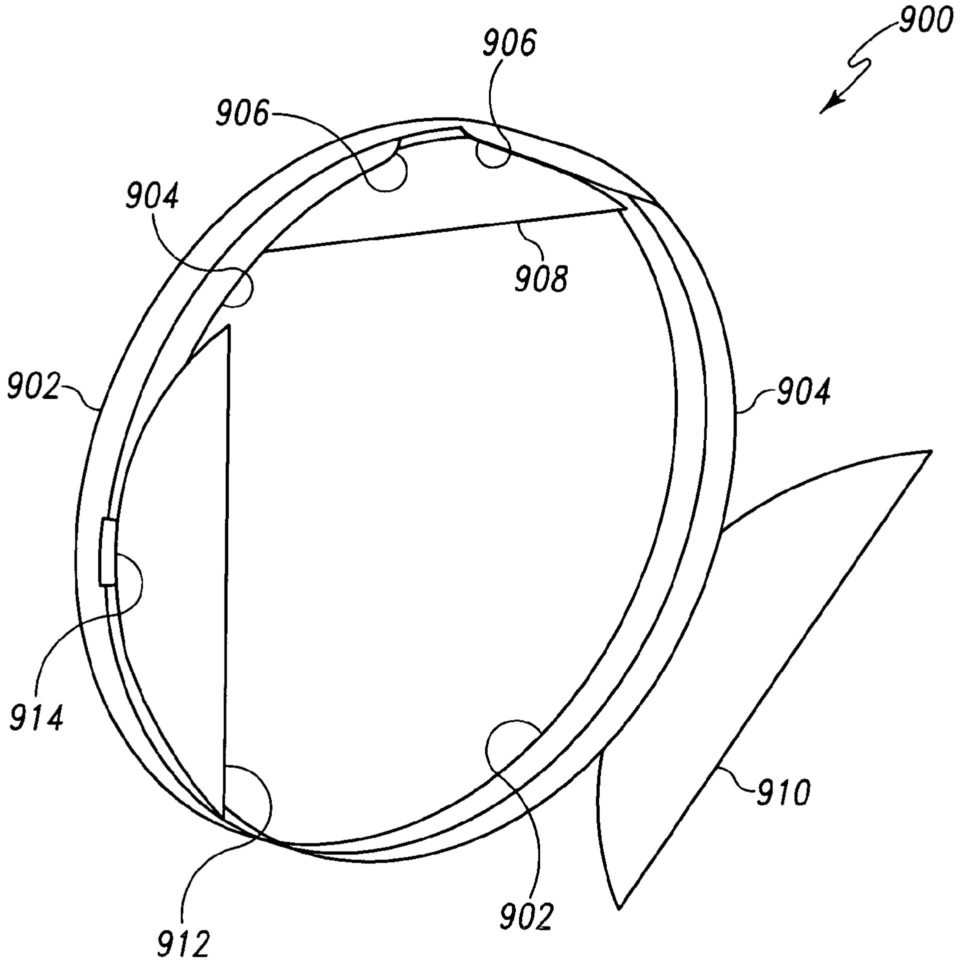
FIG. 10 shows a fourth embodiment of the foreground shield that can be utilized to reduce reflective glare.

In yet another alternative embodiment shown in FIG. 10, a plurality of protuberances are provided. Foreground shield 900 comprises rotating ring 902 and stationary ring 904. Stationary ring 904 includes cutout 906. Foreground shield 900 further includes protuberances 908, 910 and 912. The protuberances in this embodiment are of different sizes. Protuberance 908 is the smallest protuberance, and protuberance 912 is the largest. Protuberance 908 is shown in the occluding position, while protuberances 910 and 912 are in non-occluding positions.

Protuberances 908, 910 and 912 are pivotably connected to rotating ring 902 by spring loaded hinges such as hinge 914. In operation, hinge 914 biases protuberance 912 against stationary ring 904. Protuberances 908 and 910 are similarly held against stationary ring 904. As a protuberance is rotated over cutout 906, the protuberance is allowed to pivot toward the center of rotating ring 904. In FIG. 10, protuberance 908 is shown pivoted toward the center of ring 904. As rotating ring 902 moves a protuberance away from cutout 906, stationary ring 904 acts against the spring biased hinge forcing the protuberance away from the center of rotating ring 904. Those of skill in the art will appreciate that the embodiment of FIG. 10 may easily be used in lamps without cutoff shields.

In accordance with other embodiments, the protuberance may be translucent, merely reducing the amount of light that passes through lens 610 to illuminate the foreground area. Alternatively, the protuberance may function as a lens, and redirect light passing through protuberance 506 to other portions of the light pattern by providing varying degrees of narrow angle light bending and/or spreading. This allows for a variable amount of illumination to be reduced in the foreground area. These and other embodiments are within the scope of the present invention.

Referring back to FIG. 7, in operation, foreground shield 500 is initially placed in a pass-through position wherein any light striking protuberance 506 would have, but for the presence of protuberance 506, struck cutoff shield 608. In other words, protuberance 506 is located behind cutoff shield 608. Alternatively, foreground shield 500 could be placed forward of cutoff shield 608. In this alternate embodiment, the foreground shield is inverted to block foreground lighting as the glare shield is located forward of the reflector focal point. When desired, motor 614 is energized so that gear 616 rotates. Because gear 616 of motor 614 is engaged with teeth 504 of foreground shield 500, rotation of gear 616 forces foreground shield 500 to rotate.

Rotation of foreground shield 500 moves protuberance 506 from behind cutoff shield 608 into a blocking position wherein protuberance 506 extends into the beam of light reflected forward by reflector 604 and passing over cutoff shield 608. Thus, a portion of the light beam is blocked. Initially, the light blocked is at the edge of the emitted light beam. To avoid shadow areas immediately in front of the vehicle, it is preferred to rotate foreground shield 500 in a direction such that the edge of the emitted light beam away from the center of the vehicle is occluded. When protuberance 506 is rotated into its blocking position (shown in FIG. 7), the light blocked is primarily the light emitted into the foreground area and motor 614 is de-energized.

Motor 614 may be energized in response to a sensed reflective glare condition. The energization may be a result of a switch or button activated by a driver. For example, a dedicated circuit may move the glare shield when a driver activates the circuit. Alternatively, activation of the circuit may be in response to activation of a vehicle's windshield wipers. Other sensors may include, alone or in combination with any of the others, light sensors and moisture sensors.

As shown in FIG. 7, motor 614 may be mounted below lamp assembly 600. In many vehicles, the placement of lamp assemblies is constrained by vehicle design. Thus, there may not be room above the lamp assembly for an operating mechanism. As will be appreciated by those of skill in the art, the embodiment of FIG. 7 allows motor 614 to be mounted in a number of locations, such as above, below and to the side of lamp assembly 600, without adversely impacting the operation of foreground shield 500. Additionally, the motor could be located behind reflector 604, in a position remote from foreground shield 500.

Those of skill in the art will recognize that in accordance with the present invention, the shape and characteristics of the foreground shield could be varied to the desired glare reducing effects. The foreground shield may include as a means for reducing illumination in the foreground area of a headlamp a solid piece of opaque material or generally transparent material having translucent portions. Alternatively, the means for reducing illumination may comprise an area that functions as a filter, such as a color filter or a polarizing filter. Further, the shape of the protuberances of the foreground shield can take a variety of other forms.

Moreover, the foreground shield may be moved into and out of the blocking position in a variety of ways. By way of example but not of limitation, the means for receiving motive force may be teeth located on the inner or outer surface of the glare shield ring. Alternatively, the means for receiving motive force may be a bracket or an arm connected to the shield. Additionally, the glare shield may be moved by a worm gear, solenoid, or rack and pinion mechanism. These variations and others are considered to be within the scope of the present invention.

Those of skill in the art will realize that as described herein, the present invention provides significant advantages over the prior art. The invention provides a glare shield which reduces and/or eliminates foreground lighting when reflective glare conditions exist, but that also allows more intense illumination of the foreground area when reflective glare conditions do not exist. The glare shield does not require additional equipment to be placed above the headlamp assembly, and can be incorporated into a variety of light source, shield and reflector configurations.

While the present invention has been described in detail with reference to certain exemplary embodiments thereof, such are offered by way of non-limiting example of the invention, as other versions are possible. It is anticipated that a variety of other modifications and changes will be apparent to those having ordinary skill in the art and that such modifications and changes are intended to be encompassed within the spirit and scope of the invention as defined by the following claims.

What is claimed is:

1. An automobile lamp assembly comprising:

(a) a reflector having an optical axis;

(b) a light source placed such that light from the light source impinges upon the reflector and is reflected in a forward direction;

(c) a lens located forward of the reflector, such that light reflected by the reflector passes through the lens and exits the lamp assembly in the form of a beam producing an illumination field, the illumination field having an upper area and a foreground area; and (d) a reflective glare reducing shield comprising a ring with a vacant center, teeth arranged about the ring, and a protuberance arranged upon the ring and protruding into the center of the ring, so that the shield is moveable by rotation within a plane generally perpendicular to the optical axis between a first position and a second position, such that when the shield is in the first position, a first illumination level is produced by the beam of light in the foreground area, and such that when the shield is in the second position, a second illumination level is produced by the beam of light in the foreground area, the second illumination level being less than the first illumination level.

2. The lamp assembly of claim 1, wherein the shield is moveable between a plurality of positions between the first position and the second position, such that when the shield is in each of the plurality of positions, a respective plurality of illumination levels are produced by the beam of light in the foreground area, each of the plurality of illumination levels being greater than the second illumination level and less than the first illumination level.

3. The lamp assembly of claim 1, wherein the lamp assembly further comprises a means for rotating the shield, the means for rotating engaged with the teeth.

4. The lamp assembly of claim 3, wherein the means for rotating is in a location remote from the shield.

5. The lamp assembly of claim 1, wherein the protuberance is generally in the shape of a partial epicycloid.

6. The lamp assembly of claim 5, wherein the protuberance is opaque.

7. The lamp assembly of claim 1, the lamp assembly further comprising, a cutoff shield having an upper edge, the cutoff shield located between the glare reducing shield and the lens.

8. The lamp assembly of claim 7, wherein when the glare reducing shield is in the first position, the protuberance is lower than the upper edge of the cutoff shield so that the first illumination level is produced, and when the glare reducing shield is in the second position, the protuberance is higher than the upper edge of the cutoff shield so that the second illumination level is produced.

9. A method of reducing reflective glare produced by a lamp assembly, comprising the steps of:

providing a moveable reflective glare reducing shield having a ring with a vacant center, teeth arranged about the ring; and a protuberance arranged upon the ring and protruding into the center of the ring;

determining that a potential reflective glare producing condition exists; and rotating the moveable reflective glare reducing shield within a plane generally perpendicular to the lamp assembly's optical axis, so that the protuberance of the shield is placed in the lamp assembly's forward beam to produce an illumination field formed by the light exiting the lamp assembly with reduced illumination in the foreground area of the illumination field.

10. The method of claim 9, wherein the step of rotating the shield comprises the step of rotating an opaque protuberance into the forward beam of the lamp assembly.

* * * * *